US012709353B2

(12) United States Patent
Reimann et al.

(10) Patent No.: US 12,709,353 B2
(45) Date of Patent: Aug. 18, 2026

(54) METHOD FOR OPERATING A DRIVE UNIT OF A VEHICLE OPERABLE BY MUSCLE POWER AND/OR MOTOR POWER

(71) Applicant: Robert Bosch GmbH, Stuttgart (DE)

(72) Inventors: Alexander Reimann, Nehren (DE); Florian Geyer, Metzingen (DE); Jochen Unmuth, Heroldstatt (DE); Timo Benzel, Tuebingen-Derendingen (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 18/509,530

(22) Filed: Nov. 15, 2023

(65) Prior Publication Data

US 2024/0174321 A1 May 30, 2024

(30) Foreign Application Priority Data

Nov. 28, 2022 (DE) ..................... 10 2022 212 728.5

(51) Int. Cl.
*B62M 6/45* (2010.01)
*H02K 7/02* (2006.01)
*H02P 23/14* (2006.01)
*H02P 23/24* (2016.01)

(52) U.S. Cl.
CPC ................. *B62M 6/45* (2013.01); *H02K 7/02* (2013.01); *H02P 23/14* (2013.01); *H02P 23/24* (2016.02)

(58) Field of Classification Search
CPC ........... B62M 6/45; H02P 23/24; H02P 23/14; H02K 7/02
See application file for complete search history.

(56) References Cited

U.S. PATENT DOCUMENTS 5,458,098 A * 10/1995 Yagi ...................... F02N 19/005 123/179.3
6,297,606 B1 * 10/2001 Yoshioka ............... B60J 7/0573 318/467
7,156,780 B1 * 1/2007 Fuchs ...................... B62M 6/45 482/92
7,545,111 B2 * 6/2009 Fu .......................... G01R 31/24 318/434
8,358,095 B2 * 1/2013 Savagian ............. G01R 31/343 318/40
8,682,573 B2 * 3/2014 Anderson .......... G01C 21/3492 701/439
2011/0079453 A1 * 4/2011 Wanger ................ B62K 27/003 180/11
2016/0347408 A1 * 12/2016 Guida ...................... B62M 6/75
2021/0344265 A1 11/2021 Binder et al.

FOREIGN PATENT DOCUMENTS

DE 10 2014 011 293 A1 2/2015
DE 10 2013 226 143 B3 3/2015
DE 10 2014 201 855 A1 8/2015
DE 10 2020 202 996 A1 9/2021
DE 10 2021 200 025 A1 7/2022

* cited by examiner

*Primary Examiner* — Gertrude Arthur Jeanglaude
(74) *Attorney, Agent, or Firm* — Maginot, Moore & Beck LLP

(57) ABSTRACT

A method for operating a drive unit of a vehicle operable by muscle power and/or motor power and comprising an electric motor and a control unit includes, in response to a system start of the drive unit, actuating the electric motor at a start current such that the electric motor rotates in a reverse direction of rotation.

20 Claims, 2 Drawing Sheets

1
2
3
4
7
10
100

METHOD FOR OPERATING A DRIVE UNIT OF A VEHICLE OPERABLE BY MUSCLE POWER AND/OR MOTOR POWER

This application claims priority under 35 U.S.C. § 119 to application No. 10 2022 212 728.5, filed on Nov. 28, 2022 in Germany, the disclosure of which is incorporated herein by reference in its entirety.

The present disclosure relates to a method for operating a drive unit of a vehicle operable by muscle power and/or motor power, a control unit, and an electric motor.

BACKGROUND

Methods for monitoring operating parameters of electric motors, e.g. for electric bikes, by means of sensors are known. Often, knowledge of the operating parameters is necessary in order to operate the electric motor. In this context, a sensor system and control of the electric motor are, e.g., initialized during a start process. Conventionally, not all relevant properties of the electric motor can be detected directly.

SUMMARY

In contrast, the method according to the disclosure is characterized by the fact that a system start of the drive unit can be performed in a particularly simple and time-efficient manner, in particular in which full torque provision is made possible after a particularly short period of time. According to the disclosure, this is achieved by a method for operating a drive unit of a vehicle operatable using muscle power and/or motor power, preferably an electric bike. The drive unit in this case comprises an electric motor and a control unit. In the method, in response to a system start of the drive unit, the electric motor is actuated at a predefined start current such that the electric motor rotates in a reverse direction of rotation.

In particular, a start routine of the drive unit of the vehicle with electric motor and control unit is regarded as a system start, whereby within this start routine the drive unit is completely put into a standby mode or into driving readiness. Preferably, at least the electric motor and/or the control unit is set to standby mode or made ready to drive. For example, a system start can be considered to be a starting operation of the electric motor after the electric motor has previously been in a switched-off state in which, e.g., no operation of the electric motor has taken place.

Preferably, the system startup features a maximum duration of 2 seconds, especially preferably a maximum of 1 second. In other words, the method is in particular only performed within this period of system startup.

Preferably, the system start can be determined by means of a corresponding system start signal, such that the method is, e.g., performed in response to the determination of the system start signal.

The start current can preferably be designed such that only the rotary motion of the electric motor in the reverse direction of rotation is initiated, in particular without any significant torque generation taking place. In other words, a start current can be generated at a low current intensity, which is preferably sufficient to set the electric motor in rotary motion.

In other words, in the method, during the starting process of the drive unit, the electric motor is actuated at the start current such that the electric motor, in particular a rotor of the electric motor, is rotated in the reverse direction of rotation. In particular, a reverse direction of rotation is considered to be a direction of rotation opposite to a forward direction of rotation of the electric motor, whereby in the forward direction of rotation the electric motor can generate a torque that can be used to propel the vehicle.

In other words, in the method, the electric motor is briefly actuated during system startup, preferably immediately simultaneously with system startup, such that it rotates in the reverse direction of rotation. As a result, an angular change of the electric motor or a rotor of the electric motor is effected when the system is started. Numerous advantages are provided as a result. In particular, it thereby possible in a simple and time-efficient manner to, e.g., check and initialize the entire motor sensor system and/or the motor software immediately when the electric motor is started, and in particular independently of the further operation of the electric motor. The full functionality of the electric motor can therefore be provided automatically following a particularly short time after the system start. It is not in particular necessary to perform initialization during normal operation of the electric motor, which would, e.g., delay torque provision. The fact that the electric motor is rotated in the reverse direction of rotation also offers the advantage that torque transmission, e.g. to a drive train of the vehicle, can be prevented, so the method can be performed at any time without affecting the driving operation or standstill of the vehicle.

The following description relates to preferred embodiments of the disclosure.

The electric motor is preferably actuated at the start current during the method for (in particular at most) a predefined period of time. In other words, the electric motor is actuated for a specific short time at the start current in response to the detected system start. The predefined time period is preferably a maximum of 1 second, preferably a maximum of 0.5 seconds. It is as a result possible to start up the electric motor in a particularly time-efficient manner and without disrupting further operation of the electric motor, in particular by means of initialization measures.

Particularly preferably, the method further comprises the following step: initializing a motor sensor system and/or motor software of the vehicle during actuation of the electric motor at the start current. Initialization is in particular considered to be the preparation of the motor sensor system and/or the motor software such that it is fully ready for normal operation of the electric motor following initialization. For example, initialization can comprise calibration and/or functional testing of at least parts of the motor sensor system and/or motor software. By rotating the electric motor in the reverse direction of rotation, initialization can be performed automatically at system startup in a particularly simple and efficient manner. In other words, the electric motor can be switched to standby mode within a particularly short period of time after system startup.

Preferably, initializing the motor sensor system and/or motor software comprises rotor position calibration of the electric motor. In particular, a rotor position calibration is considered to be a calibration of an instantaneous position of a rotor of the electric motor, and/or an angle sensor of the motor sensor system, and/or rotor position software of the motor software. Due to the change in the angle of the electric motor's rotor, which is generated by the rotation of the electric motor in the reverse direction of rotation when the system is started, the rotor position calibration can be performed in a particularly simple and effective manner.

Further preferably, the method further comprises the following step: actuating the electric motor in response to a determined rider request such that the electric motor rotates in a forward direction of rotation. In particular, the determination of the rider's wish is performed by means of a rider request sensor. For example, in the case of an electric bike, an actuation of a crank mechanism of the electric bike can be regarded as a rider request, and in particular a pedaling torque of the rider can be determined by means of the rider request sensor. In particular, in the forward direction of rotation, rotation of the electric motor, especially the rotor, occurs in the opposite direction of rotation to the reverse direction of rotation. In the forward direction of rotation, motor torque can thus be generated, which can be used to propel the vehicle.

Particularly preferably, the vehicle comprises a freewheel between the electric motor and a drive train of the vehicle. Preferably, the freewheel locks in the forward direction of rotation, in particular so that torque transmission from the electric motor to the drive train is possible when the electric motor rotates in the forward direction of rotation. Further preferably, the freewheel opens in the reverse direction of rotation so that no torque is transmitted to the drive train when the electric motor rotates in the reverse direction of rotation. As a result, the method is able to be performed in a particularly simple manner and at any time, without affecting the way the vehicle operates. For example, the method can thus be performed independently of a standstill or momentary locomotion of the vehicle.

Preferably, the system start of the drive unit is initiated in response to a manual start actuation, which can preferably be entered by means of an input device. In other words, the system start of the electric motor can be initiated manually by a user of the vehicle, e.g. by pressing a button when using the input device. As a result, it is possible to transfer the electric motor from a switched-off state to a standby mode in a particularly simple and efficient manner.

Further preferably, the system start of the drive unit is initiated in response to movement of the vehicle relative to an environment of the vehicle. For example, the movement relative to the environment can be detected by means of an inertial sensor system of the vehicle. In other words, when it is, e.g., detected that the vehicle is being moved by the user, e.g. being pushed, the system start of the electric motor can be automatically initiated to put the electric motor into standby mode. A particularly high level of user comfort can thereby be provided to the user of the vehicle.

Preferably, the method further comprises the following step: actuating the electric motor at a test current in a non-torque generating direction, preferably while actuating the electric motor at the start current. A test current in the non-torque-generating direction is considered to be an actuating current of the electric motor without torque generation taking place. In particular, the test current is generated such that a stator magnetic field is oriented parallel to a rotor magnetic field. As a result, no magnetic force is exerted on the rotor by the stator magnetic field, which would generate a drive torque. In particular, the test current instead only imparts a magnetic force on the rotor in the radial direction. Software diagnostics of the electric motor can thereby be performed by simple means, in particular without additional sensors. The motor parameters can be determined with high accuracy. By establishing the test current in the non-torque generating direction, the method can be easily performed at any time, e.g., even when the vehicle is at a standstill, such as immediately after system startup of the drive unit. As a result, preferably before an electric bike starts to travel, the method can be performed to initialize the motor sensor system and/or motor software, and preferably to determine motor parameters of the electric motor. Preferably, a functionality or defects of the electric motor can be defined on this basis. In particular, the electric motor is actuated at the test current for only a short period of time, preferably not more than 200 ms, more preferably 100 ms. As a result, a system test can, e.g., be performed essentially unnoticed by a rider of the vehicle.

Preferably, a comparatively strong current is generated as the test current. In particular, the test current features a current intensity of at least 10 A, preferably at least 20 A.

The electric motor is preferably a permanent magnet synchronous machine (abbreviated as PMSM). In particular, the electric motor can therefore be at least partially designed as a brushless DC motor. Such an electric motor is characterized by, e.g., high power combined with low weight and is particularly suitable for use in electric bikes.

Preferably, the method further comprises the following step: estimating at least one motor parameter of the electric motor while actuating the electric motor at the test current. A wide range of parameters and/or properties of the electric motor, e.g. electrical properties, can be estimated as motor parameters. A particularly simple and precise estimation of the motor parameter can in this case be performed by establishing the test current.

Particularly preferably, the method further comprises the following step: detecting the following parameters of the electric motor while operating the electric motor at the test current: an angular change of an electric angle, a test voltage in the non-torque generating direction, and the test current in the non-torque generating direction. The estimation of the at least one motor parameter is in this case performed by calculating a previously known machine model of the electric motor based on the following parameters: detected angle change, detected test voltage, and detected test current. In other words, the method detects easily detectable quantities, i.e., the electrical angle, the test voltage, and the test current during operation of the electric motor at the test current in the non-torque generating direction. On the basis of these quantities, by means of the machine model, which, e.g., represents properties of the electric motor by mathematical equations characteristic of the electric motor, the motor parameters are estimated by a corresponding calculation of the machine model. A particularly precise estimation of a wide range of engine parameters during the system start of the drive unit is thereby enabled in a simple and efficient manner.

The machine model preferably features a voltage offset of the electric motor as an unknown degree of freedom. The calculation can thereby be performed in a particularly simple manner, while enabling a high degree of accuracy in the estimation of the engine parameters.

Particularly preferably, at least one strand resistance of the electric motor is estimated as the motor parameter. Preferably, all strand resistances of the electric motor are estimated. In particular, strand resistances are considered to be respective electrical resistances of different electrical phases of the electric motor. The strand resistances are dependent on the temperature, so the temperature is advantageously taken into account when determining the strand resistances for precise knowledge of the states of the electric motor. The method thereby enables such a temperature-dependent definition of the strand resistances, in particular since the detected values used to calculate the machine model are also temperature-dependent. For example, in a star-connected electric motor, there are a total of three electrical phases and thus a total of three strand resistances.

Preferably, the strand resistances are estimated based on the following equations:

$$\begin{pmatrix} Ud \\ Uq \end{pmatrix} = \begin{pmatrix} R11 & R12 \\ R21 & R22 \end{pmatrix} \begin{pmatrix} Id \\ Iq \end{pmatrix}$$

where Id is the current in the non-torque generating direction, and Iq is the current in the torque-generating direction. Preferably, Iq is zero when the method is performed. Similarly, Ud is the voltage in the non-torque generating direction, and Uq is the voltage in the torque-generating direction. For the stress in the non-torque generating direction with additional consideration of the stress offset ΔUd, offset, and when Iq=0, the following equation is obtained:

$$\Delta Ud,\text{offset} + Ud = R11 \cdot Id$$

The following equations apply to R11, R12, R21, and R22:

$$R11 = \frac{Rb+Rc}{2} + \frac{\cos^2(\varphi)}{3}(2Ra - Rb - Rc) - \frac{\sqrt{3}\sin(2\varphi)}{6}(Ra - Rb)$$

$$R12 = \frac{\sin(2\varphi)}{6}(Rb + Rc - 2Ra) - \frac{\sqrt{3}\cos(2\varphi)}{6}(Rb - Rc)$$

$$R21 = \frac{\sin(2\varphi)}{6}(Rb + Rc - 2Ra) - \frac{\sqrt{3}\cos(2\varphi)}{6}(Rb - Rc)$$

$$R22 = \frac{Rb+Rc}{2} + \frac{\sin^2(\varphi)}{3}(2Ra - Rb - Rc) - \frac{\sqrt{3}\sin(2\varphi)}{6}(Rb - Rc)$$

where Ra, Rb, and Rc are the strand resistances of the electric motor and φ the electrical angle. This results in the following equation, based on which the strand resistances Ra, Rb, and Rc can be estimated by means of the estimation step:

$$\frac{Id}{2}\left[\frac{2\cos^2(\varphi)}{3}Id;\ \frac{1}{2} - \frac{\cos^2(\varphi)}{3} - \frac{\sqrt{3}\sin(2\varphi)}{6};\ \frac{1}{2} - \frac{\cos^2(\varphi)}{3} + \frac{\sqrt{3}\sin(2\varphi)}{6};\ -\frac{1}{Id}\right]\begin{bmatrix} Ra \\ Rb \\ Rc \\ \Delta Ud,\ \text{offset} \end{bmatrix} = Ud$$

An electrical angle can preferably be considered as an instantaneous angle between electrical currents of the different phases of the electric motor.

Preferably, the method is further performed by comparing the estimated strand resistances with each other. Based on the comparison of the estimated strand resistances, a determination is then made as to whether a defect exists in the electric motor. It is in particular assumed that, in a fault-free condition, all strand resistances of the electric motor will have the same resistance values at the same temperature. Therefore, by comparing the strand resistances precisely estimated by means of the method, e.g., if there are significant deviations of at least two strand resistances from each other, defects of the electric motor can be easily and reliably concluded. For example, if a defect is detected, then a corresponding message can be issued to the rider of the vehicle. Alternatively or additionally, in response to a detected defect, operation of the electric motor, e.g. an electrical supply with a current in the torque-generating direction, can be prevented.

Particularly preferably, the electric motor is recognized as being defective if at least two strand resistances of the multiple estimated strand resistances deviate from each other by a predefined amount. In other words, the electric motor is determined to be defective if at least two strand resistances differ significantly from each other. Since, in particular, a functional or non-defective electric motor features essentially the same strand resistance at the same temperature, it is particularly easy to detect whether a defect exists in the electric motor.

Preferably, an electrical contact problem of the electric motor and/or a partial short circuit at the electric motor is detected if at least two of the estimated strand resistances differ from each other by a factor of at least 1.5, particularly preferably at least 2. In other words, an estimated strand resistance that is at least 1.5 times, especially at least 2 times, that of another estimated strand resistance is considered to indicate a defect in the form of an electrical contact problem and/or a partial short circuit. For example, an electrical contact problem can occur due to an improperly connected plug to the electric motor power supply. This can be detected particularly easily and reliably by means of the method.

Particularly preferably, the estimation of the strand resistances is performed by calculating the previously known machine model, in particular the mathematical equations described hereinabove, by means of a fast DSFI algorithm. A particularly high accuracy of the determined strand resistances can be provided as a result.

Preferably, the method further comprises the following step: determination of winding temperatures by means of a temperature observation means. The estimated strand resistances, as well as previously known calibration strand resistances and previously known calibration winding temperatures, are used as input variables of the temperature observation means. In particular, a control system that reconstructs non-measurable variables from known input variables and also, e.g., output variables of an observed system is regarded as a temperature observation means. In detail, the temperature observation means determines the winding temperature of the electric motor, which corresponds to the current temperature of one of the windings or phases of the electric motor. Particularly preferably, winding temperatures are determined for all windings or phases of the electric motor. Previously known calibration strand resistances and previously known calibration winding temperatures are considered to be strand resistances or temperatures of the windings of the electric motor, which have, e.g., been measured in a one-time test method, e.g. during the manufacture of the electric motor, and are preferably stored. In particular, the temperature observation means can thus easily and accurately define the instantaneous winding temperatures of the electric motor based on the estimated instantaneous strand resistances.

Particularly preferably, the winding temperatures 19 are determined by means of the following equation:

$$\vartheta = \frac{\left(\frac{R(\vartheta)}{R0(\vartheta 0)} - 1\right)}{\alpha 0 + \vartheta 0}$$

where R(∂) is the respective estimated strand resistance, R0(∂0) is the calibration strand resistance, ∂0 is the calibration winding temperature, and α0 is a heat transfer coefficient of a material of the winding of the electric motor. For example, α0 is the heat transfer coefficient of copper when the winding is made of copper.

Further preferably, the method further comprises the following step: detecting a sensor temperature of the electric motor by means of a temperature sensor simultaneously with the determination of the winding temperature by means of the temperature observation means. The detected sensor temperature is used as a further input variable of the temperature observation means. Doing so can in particular further increase an accuracy of the winding temperature determined by means of the temperature observation means.

Preferably, the method further comprises the following steps:

determining an observation means sensor temperature using the temperature observation means, whereby the observation means sensor temperature represents the sensor temperature, comparing the sensor temperature and the determined observation means sensor temperature with each other, and correcting the temperature observation means based on the comparison between the sensor temperature and the observation means sensor temperature.

In other words, by means of the temperature observation means, the observation means sensor temperature is additionally determined such that it corresponds to a temperature at the point where the temperature sensor measures the sensor temperature. As a result, by comparison, an estimation error of the temperature observation means can be determined and, based on this estimation error, the temperature observation means can be corrected. A particularly high accuracy of the temperature observation means can therefore be provided.

Preferably, a winding temperature is determined separately for each winding of the electric motor. The temperatures of the electric motor are able to be monitored particularly precisely as a result. Alternatively, a global winding temperature is determined for all windings of the electric motor. Particularly simple and cost-effective performance of the method can be provided as a result.

Further preferably, the method further comprises the following steps:

detecting an actuating current at which the electric motor is actuated, in particular during operation of the vehicle, and determining a winding power loss of the electric motor based on the estimated strand resistances and additionally based on the determined actuating current. In particular, determination of the winding power loss $P_{loss}$ can be performed based on the following equation:

$$P_{loss} = R(\vartheta) \cdot I_{phase}^2$$

at the estimated strand resistance R(∂) and the actuating current$I_{phase}$. It is as a result possible to monitor another characteristic of the electric motor by simple and precise means.

Preferably, the determined winding power loss is used to further improve the estimation performance of the temperature observation means. For example, the determined winding power loss can in this case be used as an additional input variable of the temperature observation means. In particular, the winding power dissipation acts as a heat flux in this process, which excites the temperature model. A particularly high accuracy of the temperature observation means is enabled thereby.

The disclosure further relates to a control unit of an electric motor. The control unit is in this case configured to actuate the electric motor, in particular to supply the electric motor with a current in a torque-generating direction and in a non-torque generating direction. The current is preferably provided by an electrical energy storage means. The control unit is in this case configured to perform the method described hereinabove.

The disclosure further relates to an electric motor comprising the described control unit. The electric motor is preferably intended for use in a vehicle, especially preferably in an electric bike.

BRIEF DESCRIPTION OF THE DRAWINGS

The disclosure is described in the following with reference to exemplary embodiments in conjunction with the drawings. In the drawings, functionally identical components are in each case identified using identical reference characters. Shown are.

DETAILED DESCRIPTION

Figure 1:
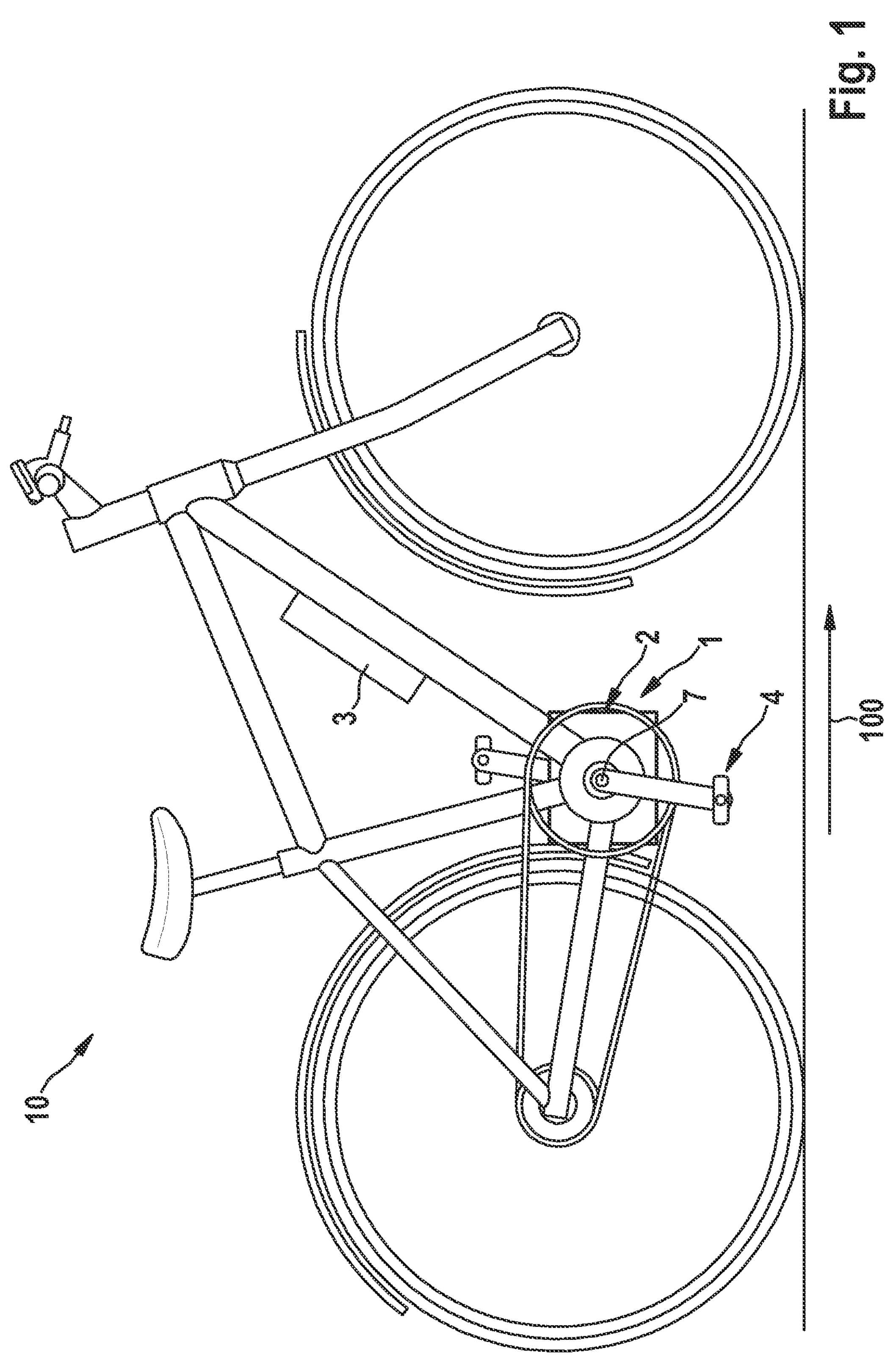
FIG. 1 a schematic view of an electric bike in which a method according to a preferred exemplary embodiment of the disclosure is performed, and FIG. 2 a highly simplified schematic view of the method steps of the method according to the disclosure.

FIG. 1 shows a simplified schematic view of an electric bike 10. The electric bike 10 includes a drive system 1, which comprises an electric motor 2. The electric motor 2 is arranged in the area of a bottom bracket 7 of the electric bike 10, and is provided to support a manual pedaling force of a rider of the electric bike 10 by means of pedals 4 by a torque generated by an electric motor.

The drive system 1 further comprises an electrical energy storage unit 3, by means of which the electric motor 2 can be supplied with electrical energy. A control unit is also integrated into the electric motor 2.

In this case, the control unit is configured to perform a method 20 for operating the electric motor 2. By means of the method 20, a preparation of the electric motor 2 as well as a motor sensor system and motor software can be performed at a system start of the electric motor 2 and prior to a normal operation, during which a generation of the electric motor torque to support the manual pedaling force of the rider is performed.

Furthermore, strand resistances of the electric windings of the electric motor 2 can be determined by means of the method. In addition, temperature monitoring of the electric motor 2 can be performed by means of the method 20.

Figure 2:
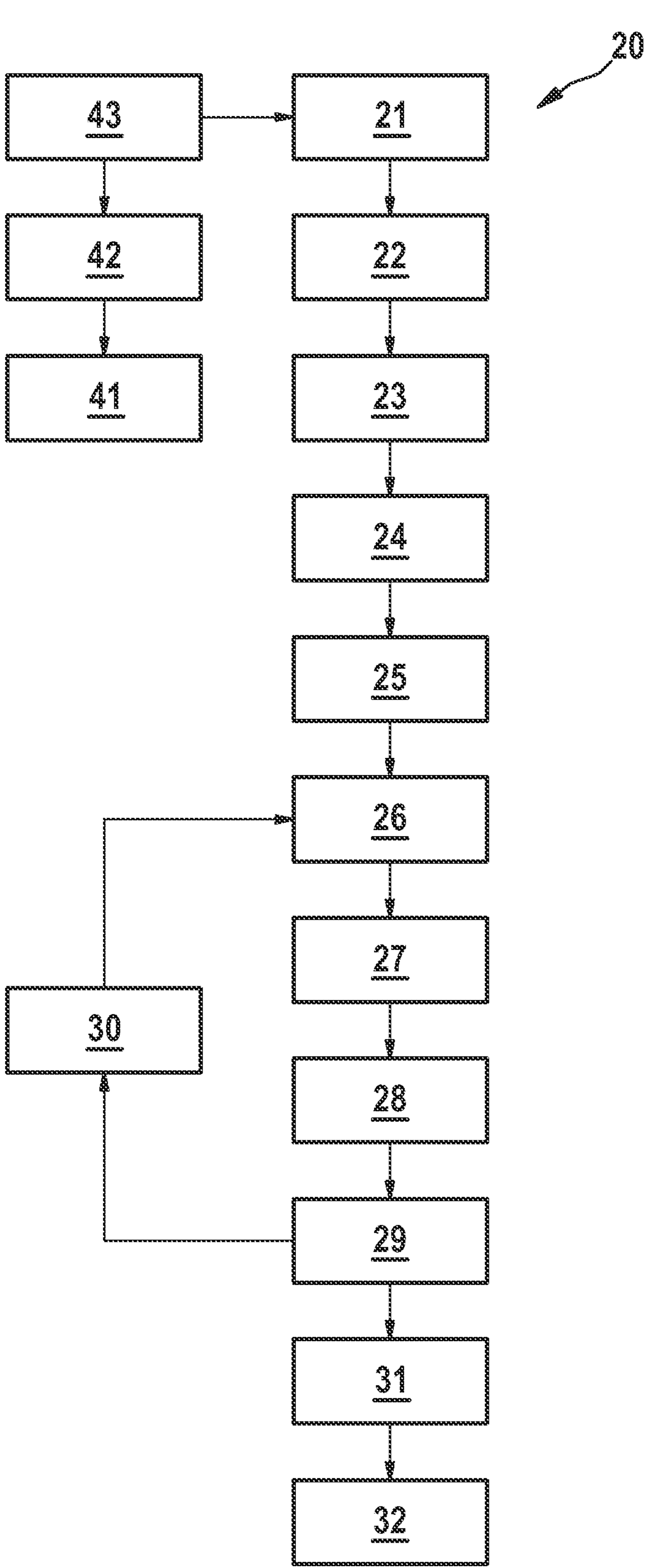

The sequence of the method 20 is shown schematically in a highly simplified form in FIG. 2.

The method 20 is performed when the electric motor 2 is started by the system, preferably while the electric bike 10 is stationary and/or while the electric bike 20 is being pushed by the rider.

In the method 20, a detection 41 of the system start of the electric motor 2 is first performed. The detection 41 of the system start can be based on a manual start actuation of the rider by means of an input device, which means, e.g., pressing a button. Alternatively or additionally, the detection

41 of the system start can be based on a sensor-based detection of a movement of the electric bike 10 relative to the environment.

Immediately after detection 41 of the system start of the electric motor 2, an actuation 42 of the electric motor 2 at a predefined start current for a predefined period of time, e.g. 0.5 seconds, is performed automatically. The start current is in this case designed such that a rotor of the electric motor 2 is rotated in a reverse direction of rotation. The reverse direction of rotation is opposite to a forward direction of rotation, whereby in the forward direction of rotation the rotor of the electric motor 2 rotates such that a torque correspondingly generated by the electric motor 2 causes the electric bike 10 be propelled in the direction of travel A via a drive train of the electric bike 10.

The electric bike 10 in this case comprises a freewheel between the electric motor 2 and the drive train, which is designed such that it locks when the electric motor 2 rotates in the forward direction of rotation, i.e., it causes a torque transmission. When the electric motor 2 rotates in the reverse direction of rotation, the freewheel opens and thereby prevents torque transmission between the electric motor 2 and the drive train. As a result, the electric motor 2 can rotate freely when actuated at the start current without causing any movement of the electric bike 10.

During the actuation 42 of the electric motor 2 at the start current, initialization 43 of the motor sensor system and the motor software are performed simultaneously. In detail, among other things, a rotor position calibration of the electric motor 2 is performed thereby.

Initialization 43 is in this case performed during actuation 42 of the electric motor 2 at the start current. After this process has been completed, the electric motor 2 is preferably in a standby mode in which normal torque generation by the electric motor 2 can be initiated at any time. In particular, during normal operation of the electric motor 2, the electric motor 2 can be actuated in response to a determined rider request such that the electric motor 2 is rotated in the forward direction of rotation and generates a motor torque to drive the electric bike 10 with electric motor assistance.

Simultaneously with or, alternatively, after the actuation 42 of the electric motor 2 at the start current, an actuation 21 of the electric motor 2 can be performed at a test current in a non-torque generating direction, i.e., such that no torque is generated. During this actuation 21, a detection 22 of an angular change of an electrical angle, a test voltage in the non-torque generating direction, and the test current in the non-torque generating direction are performed.

Based on the values recorded during detection 22, an estimate 23 is then made of all the individual strand resistances of the electric motor 2. The estimate 23 is performed by calculating a previously known machine model of the electric motor 2 using a fast DSFI algorithm. The machine model is designed such that it features a voltage offset of the electric motor 2 as an unknown degree of freedom.

By means of the method 20, the instantaneous strand resistances of the electric motor 2 can therefore be estimated in a simple and inexpensive manner, in particular without the need for additional sensors.

The estimated strand resistances are then used to determine 25 whether the electric motor 2 is defective. This is performed based on comparing 24 the estimated strand resistances with each other. Provided that the comparison 24 shows that at least two of the estimated strand resistances differ by a factor of 2 or more, i.e., if one of the two compared strand resistances is at least twice as large as the other, the electric motor 2 is recognized as being "defective" during the determination 25. In detail, this can indicate an electrical contact problem of the electric motor 2 and/or a partial short circuit on the electric motor 2.

The method further comprises the step of determining 26 a winding temperature of the electric motor 2. Preferably, the determination 26 is performed simultaneously with or immediately after step 23.

In this case, the winding temperature is determined 26 by means of a temperature observation means, which uses as input variables the strand resistances estimated by estimate 23, as well as previously known calibration strand resistances and a previously known calibration winding temperature of the electric motor 2. The calibration strand resistances and the calibration winding temperature are preferably previously known parameters which have, e.g., been determined during a manufacturing process of the electric motor 2, e.g., at what is referred to as the band end.

In order to optimize the temperature observation means, a sensor temperature is detected 27 simultaneously with the determination 26 using a temperature sensor which, e.g., detects a temperature within the electric motor 2. At the same time, a determination 28 of an observation means sensor temperature is performed by means of the temperature observation means, i.e. in step 26, such that the observation means sensor temperature represents the sensor temperature of the temperature sensor. A comparison 29 between the detected sensor temperature and the determined observation means sensor temperature is then performed. Based on this comparison 29, a correction 30 of the temperature observation means is made, in particular during step 26, in order to improve the results from the temperature observation means.

Further preferably, during a riding operation of the electric bike 10, the method 20 can comprise steps 31 and 32. In step 31, an actuating current is detected 31, in particular in a torque-generating direction, by means of which the electric motor 2 is actuated. At the same time, a determination 32 of a winding power loss of the electric motor 2 is performed based on the strand resistances estimated in step 23 and additionally based on the determined actuating current.

Preferably, the winding power loss determined in step 32 can also be used as an input to the temperature observation means in order to further improve the accuracy of the temperature observation means. The winding power loss thereby excites the temperature observation means in the form of a heat flux.

What is claimed is:

1. A method for operating a drive unit of a vehicle operable by muscle power and/or motor power and comprising an electric motor and a control unit, comprising:

performing a system start of a system including the drive unit by starting the drive unit; and actuating, in response to the system start of the drive unit, the electric motor at a start current configured such that the electric motor rotates in a reverse direction of rotation without a generation of torque which propels the vehicle.

2. The method according to claim 1, wherein the electric motor is actuated at the start current in response to the system start for a predefined period of time.

3. The method according to claim 1, further comprising:

initializing a motor sensor system and/or motor software of the vehicle during the actuating of the electric motor at the start current.

4. The method according to claim 3, wherein initializing the motor sensor system and/or motor software comprises rotor position calibration.

5. The method according to claim 1, further comprising: further actuating the electric motor, after the actuating in response to the system start, in response to a determined rider request such that the electric motor rotates in a forward direction of rotation.

6. The method according to claim 1, wherein:
the vehicle comprises a freewheel between the electric motor and a drive train; and
the freewheel locks in the forward direction of rotation and opens in the reverse direction of rotation.

7. The method according to claim 1, wherein:
performing the system start of the drive unit is initiated in response to a manual start actuation provided through an input device.

8. The method according to claim 1, wherein performing the system start of the drive unit is initiated in response to a movement of the vehicle relative to an environment.

9. The method according to claim 1, further comprising: further actuating the electric motor at a test current in a non-torque generating direction during the actuating at the start current.

10. The method according to claim 9, further comprising: estimating at least one motor parameter of the electric motor during the further actuation of the electric motor at the test current.

11. The method according to claim 10, further comprising:
detecting an angular change of an electric angle, a test voltage in the non-torque generating direction, and the test current in the non-torque generating direction during the further actuation of the electric motor at the test current,
wherein the estimation of the at least one motor parameter is performed by calculating a previously known machine model of the electric motor based on the detected angular change, and/or the detected test voltage, and/or the detected test current.

12. The method according to claim 11, wherein the machine model features a voltage offset of the electric motor as an unknown degree of freedom.

13. A control unit of an electric motor, which is configured to actuate the electric motor and to performing the method according to claim 1.

14. An electric motor comprising a control unit according to claim 13.

15. A method for operating a drive unit of a vehicle operable by muscle power and/or motor power and comprising an electric motor and a control unit, comprising:
actuating the electric motor at a start current configured such that the electric motor rotates in a reverse direction of rotation; and
further actuating the electric motor at a test current in a non-torque generating direction during the actuating at the start current.

16. The method according to claim 15, further comprising:
estimating at least one motor parameter of the electric motor during the further actuation of the electric motor at the test current.

17. The method according to claim 16, further comprising:
detecting an angular change of an electric angle, a test voltage in the non-torque generating direction, and the test current in the non-torque generating direction during the further actuation of the electric motor at the test current,
wherein the estimation of the at least one motor parameter is performed by calculating a previously known machine model of the electric motor based on the detected angular change, and/or the detected test voltage, and/or the detected test current.

18. The method according to claim 17, wherein the machine model features a voltage offset of the electric motor as an unknown degree of freedom.

19. A method for operating a drive unit of a vehicle operable by muscle power and/or motor power and comprising an electric motor and a control unit, comprising:
performing a system start of a system including the drive unit by starting the drive unit;
actuating, in response to the system start of the drive unit, the electric motor at a start current configured such that the electric motor rotates in a reverse direction of rotation;
further actuating the electric motor at a test current in a non-torque generating direction during the actuating at the start current;
estimating at least one motor parameter of the electric motor during the further actuation of the electric motor at the test current; and
detecting an angular change of an electric angle, a test voltage in the non-torque generating direction, and the test current in the non-torque generating direction during the further actuation of the electric motor at the test current,
wherein the estimation of the at least one motor parameter is performed by calculating a previously known machine model of the electric motor based on the detected angular change, and/or the detected test voltage, and/or the detected test current.

20. A method for operating a drive unit of a vehicle operable by muscle power and/or motor power and comprising an electric motor and a control unit, comprising:
actuating the electric motor at a start current configured such that the electric motor rotates in a reverse direction of rotation;
further actuating the electric motor at a test current in a non-torque generating direction during the actuating at the start current;
estimating at least one motor parameter of the electric motor during the further actuation of the electric motor at the test current; and
detecting an angular change of an electric angle, a test voltage in the non-torque generating direction, and the test current in the non-torque generating direction during the further actuation of the electric motor at the test current,
wherein the estimation of the at least one motor parameter is performed by calculating a previously known machine model of the electric motor based on the detected angular change, and/or the detected test voltage, and/or the detected test current.

* * * * *